US009565885B2

(12) United States Patent
Hedges et al.

(10) Patent No.: US 9,565,885 B2
(45) Date of Patent: Feb. 14, 2017

(54) MODULAR DAY MODE/NIGHT MODE HELMENT-MOUNTED DISPLAY

(75) Inventors: George Darrell Hedges, Grennfield, PA (US); Anthony William Bugno, Clarks Summit, PA (US); Mark William Edel, Downers Grove, IL (US); Michael Koichi Uchima, Naperville, IL (US); Robert B. Atac, Batavia, IL (US)

(73) Assignee: THALES VISIONIX, INC., Clarksburg, MD (US)

( * ) Notice: Subject to any disclaimer, the term of this patent is extended or adjusted under 35 U.S.C. 154(b) by 0 days.

(21) Appl. No.: 13/359,760

(22) Filed: Jan. 27, 2012

(65) Prior Publication Data

US 2012/0120482 A1    May 17, 2012

Related U.S. Application Data

(63) Continuation of application No. 12/252,078, filed on Oct. 15, 2008, now Pat. No. 8,120,857.

(51) Int. Cl.
*G02B 27/14* (2006.01)
*A42B 3/04* (2006.01)
*G02B 27/01* (2006.01)
*G02B 6/00* (2006.01)

(52) U.S. Cl.
CPC ............... *A42B 3/042* (2013.01); *A42B 3/04* (2013.01); *G02B 27/0176* (2013.01); *G02B 6/00* (2013.01); *G02B 2027/0187* (2013.01)

(58) Field of Classification Search
CPC ... A42B 3/04; A42B 3/042; G02B 2027/0187; G02B 27/0176; G02B 6/00
USPC ............... 359/630, 129, 496, 618, 629, 634, 636,359/638–640, 831, 833–834; 353/31, 34, 81; 451/28, 41
See application file for complete search history.

(56) References Cited

U.S. PATENT DOCUMENTS

| | | | |
|---|---|---|---|
| 4,361,384 A | 11/1982 | Bosserman | |
| 4,449,787 A | 5/1984 | Burbo et al. | |
| 4,866,229 A * | 9/1989 | Scharfenberg | 250/203.3 |
| 4,918,752 A * | 4/1990 | Briggs | 2/6.2 |
| 4,961,626 A | 10/1990 | Fournier, Jr. et al. | |
| 4,987,608 A | 1/1991 | Cobb | |
| 5,089,914 A * | 2/1992 | Prescott | 359/815 |
| 5,184,231 A * | 2/1993 | Ellis | 359/13 |
| 5,226,181 A | 7/1993 | Polednak et al. | |
| 5,331,684 A | 7/1994 | Baril et al. | |
| 5,367,402 A * | 11/1994 | Holmes et al. | 359/400 |

(Continued)

FOREIGN PATENT DOCUMENTS

| | | |
|---|---|---|
| EP | 0395570 A2 | 10/1990 |
| EP | 1619535 A1 | 1/2006 |

OTHER PUBLICATIONS

Israeli Examination Report dated Mar. 10, 2014.

(Continued)

*Primary Examiner* — Scott J Sugarman
*Assistant Examiner* — Vipin Patel
(74) *Attorney, Agent, or Firm* — Arent Fox LLP (57) ABSTRACT

A helmet mounted display (HMD) system comprising (i) a display device adapted to be positioned between an eye of a person wearing the helmet and a vision-related device; and (ii) a step-in visor which is positioned between the eye of the user and the display device. The vision-related device is removably attached to an accessory joint so that it can be interchanged between an outer visor for use during the day and night vision goggles for use during the night.

17 Claims, 8 Drawing Sheets

(56) References Cited

U.S. PATENT DOCUMENTS

| | | | |
|---|---|---|---|
| 5,412,545 A | 5/1995 | Rising | |
| 5,471,678 A | 12/1995 | Dor | |
| 5,506,730 A | 4/1996 | Morley et al. | |
| 5,542,627 A | 8/1996 | Crenshaw et al. | |
| 5,581,806 A | 12/1996 | Capdepuy et al. | |
| 5,612,708 A * | 3/1997 | Ansley et al. | 345/8 |
| 5,623,730 A | 4/1997 | Baudou et al. | |
| 5,629,807 A * | 5/1997 | Hall | 359/630 |
| 5,649,061 A | 7/1997 | Smyth | |
| 5,687,034 A * | 11/1997 | Palmer | 359/827 |
| 5,713,548 A | 2/1998 | Boyer et al. | |
| 5,734,359 A | 3/1998 | van Hooreweder | |
| 5,901,369 A * | 5/1999 | Pilney | 2/6.5 |
| 5,914,816 A | 6/1999 | Soto et al. | |
| 5,940,891 A | 8/1999 | Lane | |
| 6,061,182 A | 5/2000 | Carmeli et al. | |
| 6,141,160 A | 10/2000 | Pniel | |
| 6,242,711 B1 * | 6/2001 | Cooper | 219/130.01 |
| 6,249,386 B1 | 6/2001 | Yona et al. | |
| 6,369,952 B1 * | 4/2002 | Rallison et al. | 359/630 |
| 6,421,031 B1 * | 7/2002 | Ronzani et al. | 345/8 |
| 6,445,506 B1 | 9/2002 | Eccles | |
| 6,456,261 B1 * | 9/2002 | Zhang | 345/8 |
| 6,457,179 B1 | 10/2002 | Prendergast | |
| 6,472,776 B1 | 10/2002 | Soto et al. | |
| 6,606,114 B1 * | 8/2003 | Gordon et al. | 348/64 |
| 6,687,053 B1 | 2/2004 | Holmes et al. | |
| 6,753,828 B2 * | 6/2004 | Tuceryan et al. | 345/8 |
| 6,782,654 B1 | 8/2004 | Borchardt | |
| 6,795,977 B2 * | 9/2004 | Basson et al. | 2/422 |
| 6,804,829 B2 * | 10/2004 | Crye et al. | 2/6.6 |
| 6,811,348 B1 * | 11/2004 | Meyer et al. | 403/325 |
| 6,862,748 B2 | 3/2005 | Prendergast | |
| 6,879,443 B2 | 4/2005 | Spitzer et al. | |
| 6,957,449 B2 | 10/2005 | Prendergast | |
| 6,992,275 B1 | 1/2006 | Knapp | |
| 7,004,439 B1 | 2/2006 | Taylor et al. | |
| 7,219,370 B1 | 5/2007 | Teetzel et al. | |
| 7,234,173 B2 | 6/2007 | McCalla | |
| 2004/0245383 A1 | 12/2004 | Udall | |
| 2005/0035925 A1 * | 2/2005 | Ostromek | G02B 23/125 345/8 |
| 2005/0167590 A1 * | 8/2005 | Miyano et al. | 250/330 |
| 2006/0015979 A1 * | 1/2006 | Sutter et al. | 2/9 |
| 2006/0069380 A1 | 3/2006 | Chen et al. | |
| 2006/0143764 A1 | 7/2006 | Reed et al. | |
| 2006/0290451 A1 | 12/2006 | Prendergast et al. | |
| 2007/0028370 A1 * | 2/2007 | Seng | 2/410 |
| 2007/0226865 A1 | 10/2007 | Lindgren | |
| 2008/0002262 A1 | 1/2008 | Chirieleison | |

OTHER PUBLICATIONS

PCT International Preliminary Report dated Apr. 19, 2011.
"Photographs of Commanche Compatibility HMD System—developed by Honeywel," Honeywell International Inc., publication date unknown.
Brochure: "DAY HUD, Compatible with all helmets plus clear and tinted visors," EFW, Inc., publication date unknown.
Brochure: "Integrated NVG-HUD for IHADSS," EFW, Inc., publication date unknown.
Brochure: "Lite Eye Helmet Mounted Display System—Low Cost Day/Night Helmet Mounted Display System," Kaiser Electronics, published as late as Dec. 31, 2001.
Brochure: "The Q-Sight(tm) family of helmet display products," BAE Systems, Oct. 2007.

\* cited by examiner

MODULAR DAY MODE/NIGHT MODE HELMENT-MOUNTED DISPLAY

CROSS REFERENCE TO RELATED APPLICATION(S)

This application is a continuation of U.S. patent application Ser. No. 12/252,078, filed Oct. 15, 2008.

BACKGROUND AND FIELD OF INVENTION

The present invention relates to a helmet mounted display (HMD) system.

The benefits of HMD systems in military and recreational applications are well-known. HMD allows the user to view vehicle, target cueing and other relevant information without having to refocus or look away from the user's surroundings. Many existing military helmet systems, such as aircrew helmets, were designed and manufactured prior to widespread implementation of HMD. Due to the high cost and long period of time required to develop an entirely new helmet system, there is a need for an HMD system that can be easily incorporated into existing military helmet systems, without requiring the redesign of other helmet systems and without interfering with the use of other existing helmet systems, such as visors and night vision goggles (NVG).

SUMMARY OF THE INVENTION

In one respect, the invention comprises, an apparatus comprising: a first mounting bracket affixed to a first portion of a helmet, the first mounting bracket having a first mounting surface; and a display pod having a second mounting surface, the display pod having a display device that is adapted to display images, the display pod having a disengaged state, in which the second mounting surface is positioned opposite the first mounting surface, the second mounting surface can be moved and rotated relative to the first surface, and an engaged state in which the second mounting surface is positioned against the first mounting surface and the position of the second mounting surface is fixed relative to the first mounting surface.

In another respect, the invention comprises an apparatus comprising: a mounting bracket attached to a helmet and located above a brow edge of the helmet; and a display pod having a light wave-guide optical element display, the display pod being part of a helmet-mounted display (HMD) system; wherein the display pod and the mounting bracket are adapted to enable the display pod to be removably affixed to the mounting bracket.

In yet another respect, the invention comprises a method of mounting a display pod to a helmet, the display pod including a transparent display device and being part of a helmet-mounted display system, the method comprising: (a) positioning the display pod so that the display device is located in a line of sight of an eye of a person wearing the helmet by moving a second surface located on the display pod relative to the first mounting surface located on the helmet; and (b) retaining the location of the display device in the line of sight by positioning the second mounting surface against the first mounting surface and affixing the position of the second mounting surface relative to the first mounting surface.

BRIEF DESCRIPTION OF THE DRAWINGS

The present invention will hereinafter be described in conjunction with the appended drawing figures, wherein like numerals denote like elements. It should be understood that the drawings are for purposes of illustrating the concepts of the present invention and are not necessarily the only possible configuration for illustrating the present invention.

DETAILED DESCRIPTION OF THE PREFERRED EMBODIMENT(S)

The ensuing detailed description provides preferred exemplary embodiments only and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions match those of the helmet wearer and are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

All examples and conditional language recited herein are intended to aid the reader in understanding the present principles and the concepts contributed by the inventor to furthering the art, and are to be construed as being without limitation to such specifically recited examples and conditions. Moreover, all statements herein reciting principles, aspects, and embodiments of the present principles, as well as specific examples thereof, are intended to encompass both structural and functional equivalents thereof. Additionally, such equivalents may include both currently known equivalents as well as equivalents as yet undeveloped, including any elements developed in the future that perform the same function, regardless of structure.

In the specification, elements which are common to more than one disclosed embodiment of the invention are identified in the drawings using reference numerals that differ by factors of 100. For example, a first embodiment of a display pod is identified in the specification and in FIG. 1 by reference numeral 42 and a second embodiment of the display pod is identified in the specification and in FIG. 5 by reference numeral 142. Elements which are discussed in the specification with respect to one embodiment may be identified by reference numeral in other embodiments in which that element appears, but may not be independently referred to in the specification.

Figure 1:
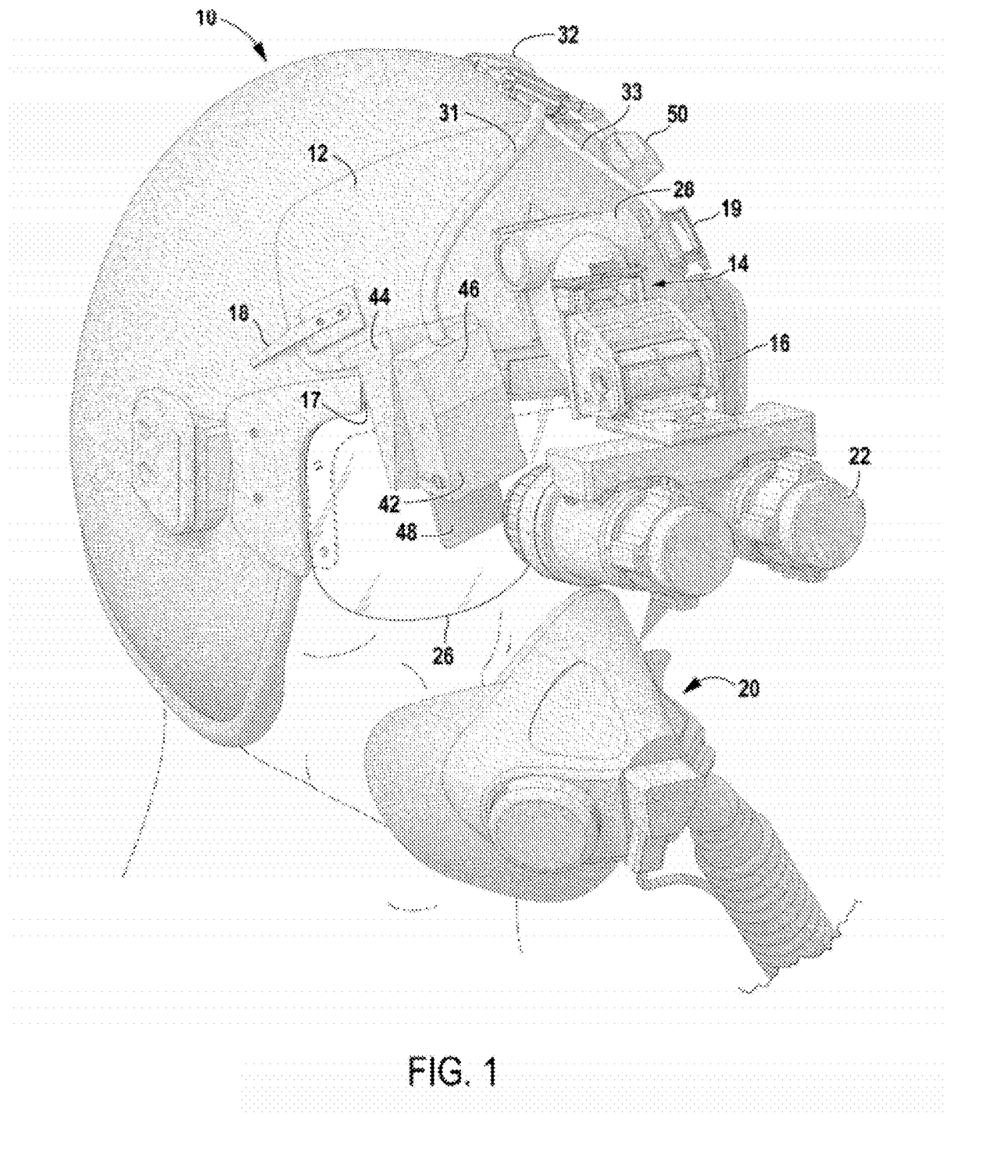
FIG. 1 is a perspective view of a helmet system, shown with NVG installed.
Figure 2:
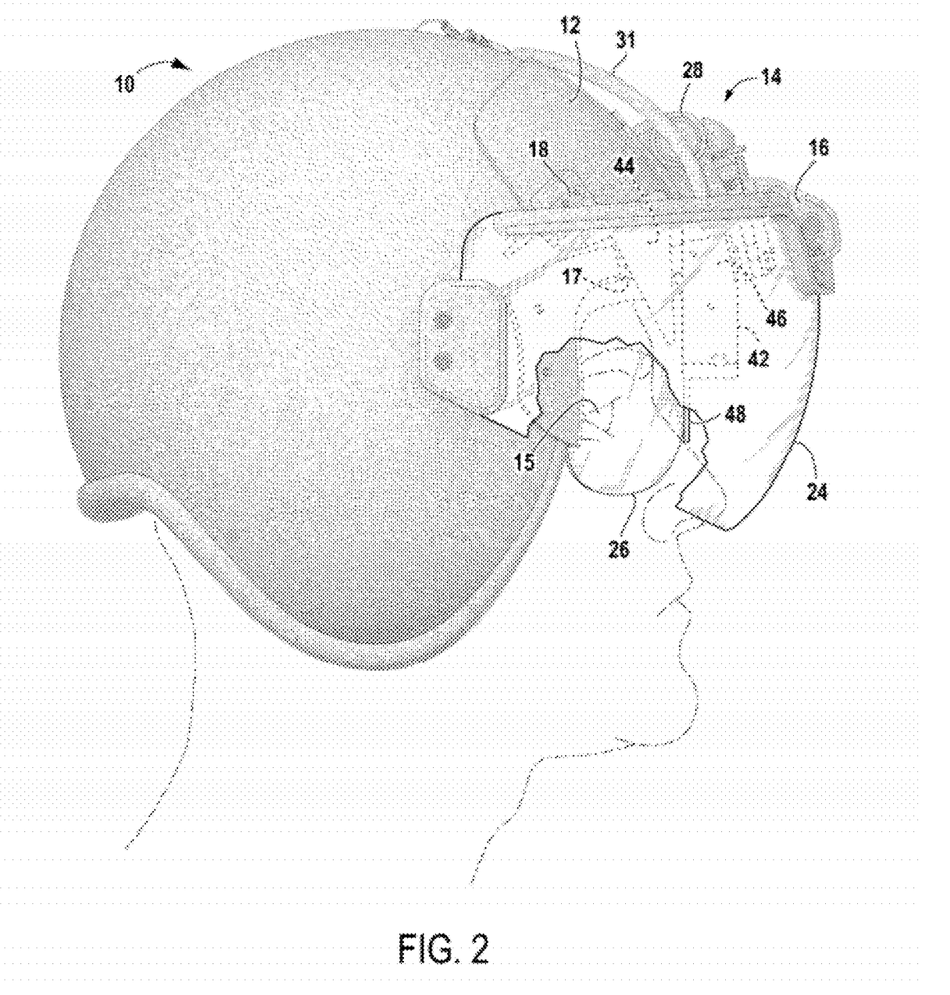
FIG. 2 is a right side view of the helmet system of FIG. 1, shown with a visor installed.

Referring to FIGS. 1 and 2, a preferred embodiment of the present invention is shown, in which reference numeral 10 refers generally to a helmet which incorporates the features of the present invention. The helmet 10 includes a base plate 12 (also referred to in the art as a "banana bar") which is used as a mounting platform for certain helmet-related accessories. The base plate 12 is preferably positioned above a brow edge 17 and is removable from the helmet 10 and, in this embodiment, is affixed to the helmet 10 by latches 18, 19. The base plate 12 includes an accessory bracket 14 (also referred to in the art as a "jet mount") having an accessory joint 16, to which accessories such as night vision goggles 22 (FIG. 1) or a visor 24 (FIG. 2) can be removably attached. Batteries 28, which are used a power source for the night vision goggles 22, are located above the accessory joint 16. A power cable 33 is connected to a helmet-vehicle interface cable 32 and provides an alternative power source for the night vision goggles 22. The night vision goggles 22 and visor 24 are shown in a deployed position (i.e., in front of the eyes of the user) in FIGS. 1 and 2. The accessory joint 16 is also preferably configured to enable accessories to be pivoted up and away from the front of the helmet 10, and therefore, out of the user's field of view. A step-in visor 26 (also referred to as a step-in lens) may also be provided and may be used in addition to or instead of the visor 24.

The helmet 10 also includes a helmet-mounted display system, comprising a display pod 42, a helmet tracker sensor 50 (FIG. 1). A display cable 31 connects the display pod 42 to the helmet-vehicle interface cable 32. The sensor 50 is also connected to the helmet-vehicle interface cable 32. The helmet-vehicle interface cable 32 connects the display pod 42 and the helmet tracker sensor 50 to an interface control unit (ICU) 34 (see FIG. 8). Other parts of the helmet-mounted display system and their relationship to other vehicle-related systems will be described herein.

The display pod 42 comprises a display driver 46 that displays HMD information on a light wave optical element (LOE) 48. An LOE 48 is a preferred display device for this application because it is small, thin, lightweight and transparent. These characteristics are of particular importance in applications in which the display pod 42 is retrofitted to an existing helmet system. One suitable type of display pod 42 is the model PD-18 LOE display system manufactured by Lumus Ltd. of Rehovot, Israel.

The primary purpose of the LOE 48 is to display useful information to the user, such as targeting information and vehicle information, without interfering with use of any of the accessories mounted on the accessory joint 16. In order to enable the LOE 48 to be used in combination with the NVG 22 and to avoid interfering with the operation of the NVG 22 or the visor 24, the display pod 42 is adapted such that the LOE 48 is positioned in front of one of the eyes 15 of the user and between the user's eye 15 and the location of the innermost surfaces of the NVG 22 or visor 24 when each is in a deployed position. Mounting of the display pod 42 above the brow edge 17 also reduces interference with other helmet-related devices, such as a respirator 20.

It should be noted that, when used in combination with the NVG 22, the display pod 42 is preferably positioned so that the NVG 22 can be viewed through the LOE 48 and positioned close to the eye 15 (i.e., without interference from the display driver 46). The thinness of the LOE 48 allows the NVG 22 to be positioned closer to the eye 15 than many other types of display devices.

In this embodiment, the helmet tracker sensor 50 is attached to the base plate 12 of the helmet 10. Its function is to provide the helmet-mounted display system with information concerning the orientation and movement of the helmet 10. In alternate embodiments, the helmet tracker sensor 50 could be attached directly to the display pod 42.

Figure 3:
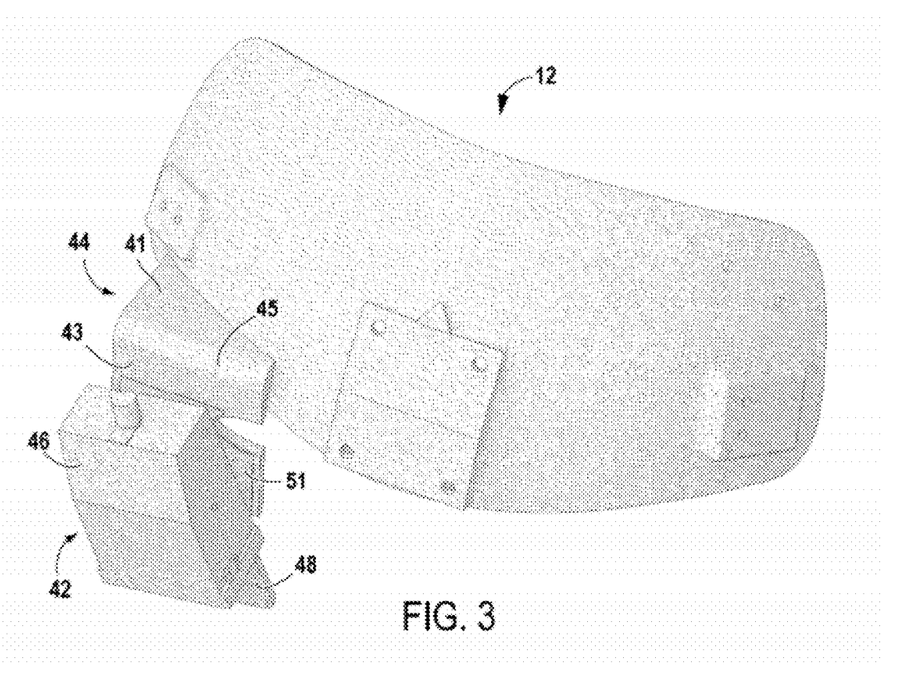
FIG. 3 is a front, top perspective view of a mounting bracket and a display pod.
Figure 4:
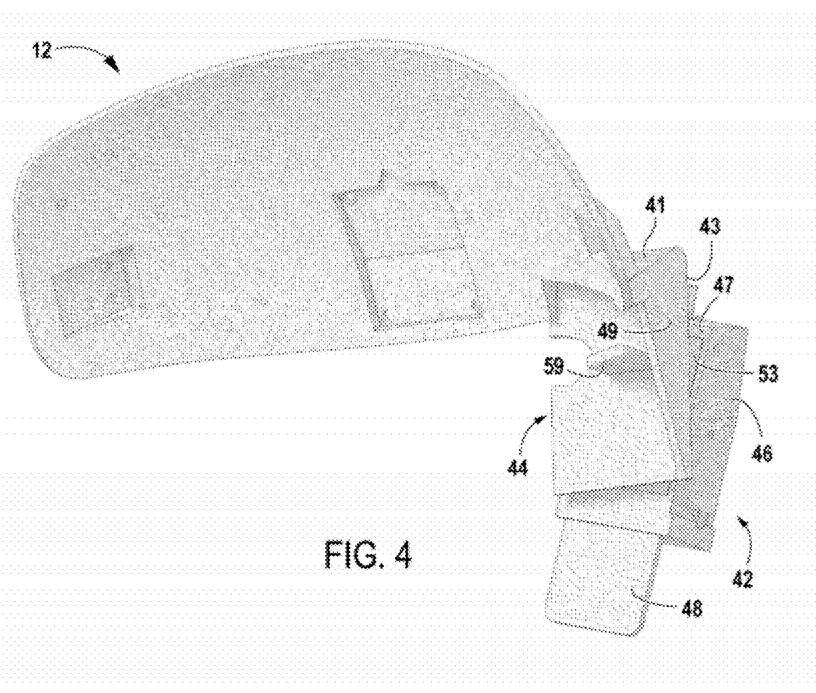
FIG. 4 is a bottom, rear perspective view of the mounting bracket and the display pod.

Referring now to FIGS. 3 and 4, the mounting structure for the display pod 42 will be described in greater detail. The base plate 12 includes a mounting bracket 44 which extends outwardly from the lower right end of the front of the base plate 12. This configuration is designed to enable the display pod 42 to be used with the user's right eye 15. In alternate embodiments, the mounting bracket 44 could be located on the lower left end of the base plate 12, which would enable the display pod 42 to be used with the user's left eye.

The mounting bracket 44 includes a mounting surface 43, which is rectangular in shape and substantially planar in this embodiment. The mounting surface 43 is connected to the base plate 12 by members 41, 45 (with reference to FIG. 3) and by members 41, 49 (with reference to FIG. 4). Similarly, the display pod 42 includes a substantially planar mounting surface 47 on the rear side of the display pod 42. Preferably, the mounting surface 47 is complimentary in size and shape to the mounting surface 43. The mounting bracket 44 may also include a tab 59 located on the rear side of the mounting surface 43. The tab 59 is positioned to fit just under the brow edge 17 and prevent the mounting bracket 44 from rising up when external forces (such as wind, sudden acceleration/deceleration, etc.) act on the display pod 42.

In order to allow the display pod 42 to be easily positioned by a user, then locked into place, it is preferable that a fastener be provided as part of each of the mounting surfaces 43, 47. Preferably, the fastener will allow the mounting surface 47 to be positioned (i.e., moved in any direction along a plane that is co-planar to the mounting surface 43) and rotated with respect to mounting surface 43. In this embodiment, a reclosable, adhesive-backed fastener 51, 53 is affixed to each of the mounting surfaces 43, 47.

The required specifications for the reclosable fastener 51, 53 will depend upon the intended use of the helmet 10. One preferred type of reclosable fastener is a Dual Lock™ brand reclosable fastener, manufactured by 3M Company. The Dual Lock™ brand reclosable fastener is a preferred fastener because it allows the mounting surface 47 to be positioned and rotated relative to mounting surface 43 so that the LOE is centered (i.e., in the line of sight) of the user's left eye, then locked into position by pressing the display pod 42 against the mounting surface 43. Alternatively, other types of hook and loop-style fasteners could be used. For the purposes of the specification and claims, the term "hook and loop-style fastener" should be understood to include traditional hook and loop fasteners, as well as other types of adhesive-backed reclosable fasteners, such as Dual Lock™ brand reclosable fasteners.

If a traditional hook and loop fastener is used, a thin divider (such as a piece of paper) is preferably placed between the hook portion and the loop portion while the display pod 42 is being positioned in order to prevent the hook portion from prematurely engaging the loop portion. When the display pod 42 has been positioned and rotated to the desired position, the divider can be slid out and the hook and loop portions pressed together.

Accordingly, the mounting structure for the display pod 42 provides a simple and inexpensive means for enabling the user to position the display pod 42 in the line of sight of one of the user's eyes, then retain that position by pressing the mounting surfaces 43, 47 together—thereby affixing the mounting surfaces 43, 47 to each other.

The display pod 42 mounting system of the present invention also enables the display pod 42 to adapt to users of the helmet 10 having many different head and eye geometries, as well as to accommodate user preferences. Accordingly, the mounting surfaces 43, 47 and the fastener 51, 53 are preferably sized to enable the center of the LOE 48 to be located at any position within an "eye box." An eye box is a rectangular area that is intended to reflect expected differences in pupil distance (the horizontal dimension of the eye box) and differences in the distance from the eye of a user to the top of his/her head (the vertical dimension of the eye box) for users of the display pod 42. In this embodiment, the eye box would be an area that is co-planar with the mounting surface 47. It is, of course, acceptable if the center of the LOE 48 has a positioning range that extends beyond the eye box.

Figures 5, 6:
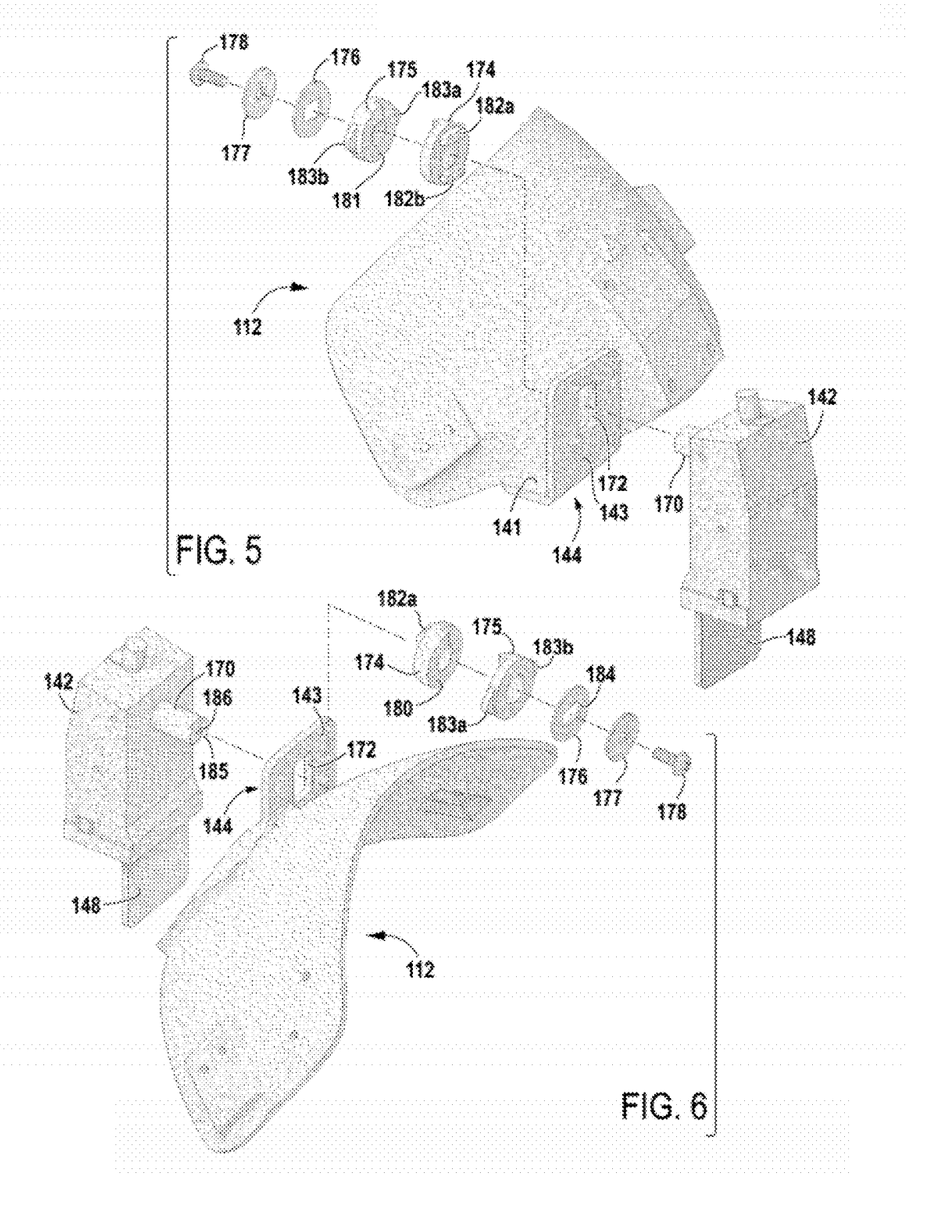
FIG. 5 is a front exploded view of a second embodiment of the mounting bracket and display pod.
FIG. 6 is a rear exploded view of the embodiment shown in FIG. 5.

An alternative display pod mounting structure is shown in FIGS. 5 through 7B. Referring to FIGS. 5 and 6, the display pod 142 includes rod 170, which is designed to be inserted through an elongated vertical slot 172 located on the vertical member 143 of the mounting bracket 144. In this embodiment, the vertical member 143 extends upwardly from the horizontal member 141 of the mounting bracket 144.

The rod 170 preferably has a round cross-sectional shape, so that it can be freely rotated in the slot 172 (which allows for adjustment of the rotational position of the display pod 142). The width of the slot 172 is preferably slightly larger than the diameter of the rod 170. In order to allow for adjustment of the vertical position of the display pod 142, the height (the vertical dimension in FIG. 6) of the slot 172 is significantly larger (preferably at least twice) the diameter of the rod 170.

To secure the display pod 142, the rod 170 is inserted through the slot 172, then an inner disk 174, an outer disk 175, an inner washer 176 and an outer washer 177 are slid onto the rod 170 and secured in place by a screw 178 that is screwed into a threaded hole 186 in the rod 170. The inner and outer disks 174, 175 have mating surfaces 180, 181 which are helical and are complimentary in shape. The inner disk 174 has two vertically-aligned members 182a, 182b, each having a width that is slightly smaller than the width of the slot 172. When inserted into the slot 172, the members 182a, 182b insure proper orientation of the inner disk 174 and prevent rotation of the inner disk 174 when the display pod 142 is in a locked position. The outer disk 175 has two tabs 183a, 183b, which provide a means for a person to rotate the outer disk 175.

The inner washer 176 has a truncated circular opening 184 (i.e., having linear top and bottom sides), which engages a tip 185 of the rod 170 having the same shape as the opening 184. The opening 184 and tip 185 cooperate to prevent the inner washer 176 from rotating when the outer disk 175 is rotated, and therefore, preventing rotation of the outer disk 175 from moving the display pod 142 from its set position.

Figure 7:
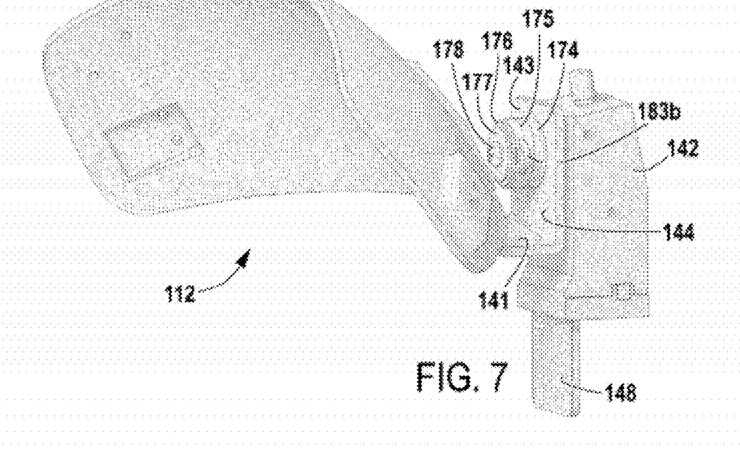
FIG. 7 is a right, rear perspective view of the embodiment shown in FIG. 5, showing the display pod in an assembled position.
Figure 7A:
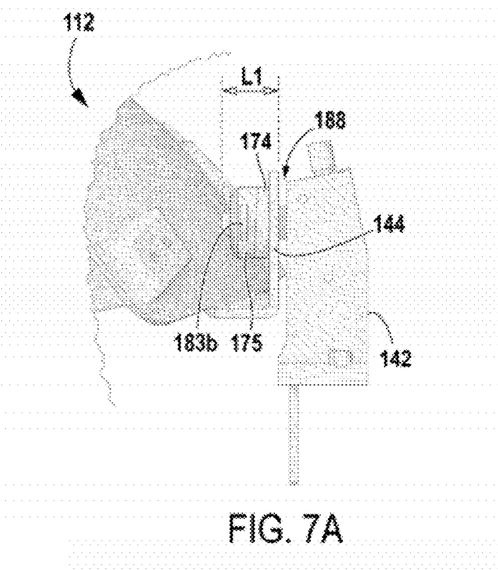
FIG. 7A is a partial right side view of the mounting bracket and display pod shown in FIG. 5, showing the display pod in a locked position.

Referring now to FIGS. 7 and 7A, once the display pod 142 is attached to the bracket 144 by the screw 178, the outer disk 175 is positioned so that the overall length L1 of the inner and outer disks 174, 175 is at a minimum (hereinafter "adjustment position"). In the adjustment position, the user can position the display pod 142 in the line of sight of one of the user's eyes by rotating the display pod 142 about the rod 170 and moving the display pod 142 up and down in the slot 172.

Figure 7B:
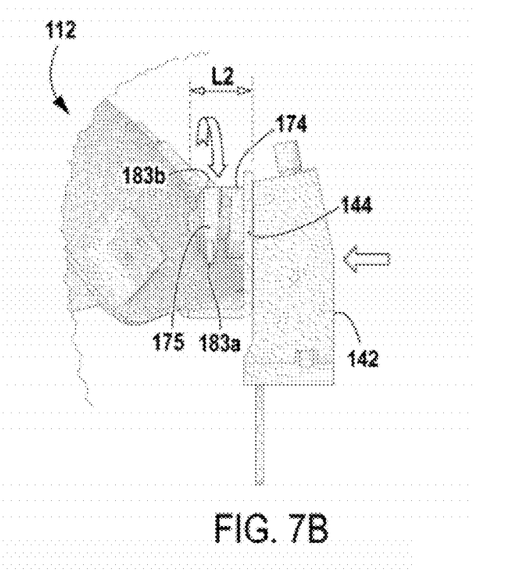
FIG. 7B is partial right side view of the mounting bracket and display pod shown in FIG. 5, showing the display pod in an unlocked position.

Referring to FIG. 7B, once the display pod 142 is in the desired position, the user then rotates the outer disk 175 clockwise (e.g., about the screw's exposed portion 188 with reference to FIG. 7A) using the tabs 183a, 183b, which increases the overall length L2 (also referred to as "axial dimension") of the inner and outer disks 174, 175. Rotation is continued until the display pod 142 is tightly drawn against the vertical member 143, which locks the display pod 142 into position.

Figure 8:
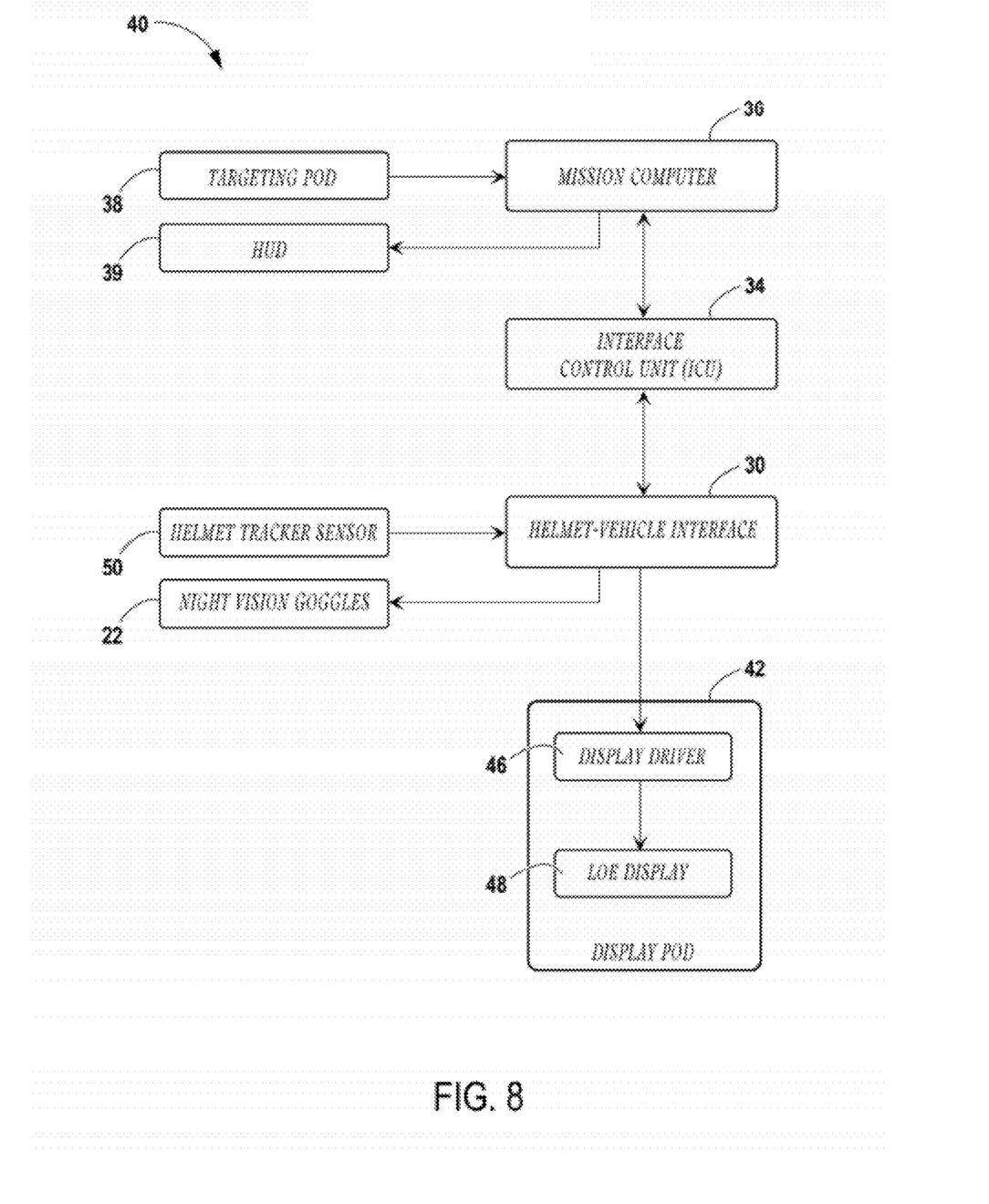
FIG. 8 is a block diagram showing the functional relationship between the display pod and other selected helmet and vehicle systems.

FIG. 8 provides a schematic representation of major components of an exemplary helmet-vehicle system 40 with which the display pod 42 (or display pod 142) could be used. Targeting information is fed to a mission computer 36 by a targeting pod 38, which typically includes an infrared camera (not shown). The mission computer 36 sends target-related and aircraft-related data to a heads-up display (HUD) system 39. Target-related and aircraft-related data is also sent by the mission computer 36 to an interface control unit 34, which processes and forwards the data to the display pod 42 via the helmet-vehicle interface 30. Data from the helmet tracker sensor 50 is collected by the helmet-vehicle control unit via the helmet-vehicle interface 30. As noted above, the night vision goggles 22 can use the helmet-vehicle interface 30 as a power source by replacing one of the two batteries with a power adapter. The remaining battery acts as a backup.

The display pod 42 is intended to display various combinations of targeting-related and/or vehicle-related information to the user (referred to herein as "symbology"). In many applications, the displayed symbology is determined by the mission computer 36. Examples of target-related information include friendly and hostile target tracking and a crosshair or reticle (e.g., indicating aiming direction for a vehicle-mounted weapon). Examples of vehicle-related information include airspeed (or ground speed for a ground-based vehicle), altitude, horizon, and heading. In some applications it will be desirable to divide the display of targeting-related and vehicle-related information between the display pod 42 and the HUD system 39. For example, target tracking information could be displayed on the HUD system 39, and a crosshair and vehicle-related information could be displayed by the display pod 42.

Due to variability in the position and orientation of the LOE 48 and variability of the position and orientation of the helmet 10, a calibration procedure is required to insure accurate alignment of symbology displayed by the display pod 42. One method of calibrating the symbology displayed on the display pod 42 in an aircraft environment will now be described. In general, the calibration procedure is designed to compensate for variations in position and orientation of the display pod 42 relative to the helmet 10, as well as the more common need to calibrate (boresight) the helmet 10 itself relative to the vehicle.

Figure 9:
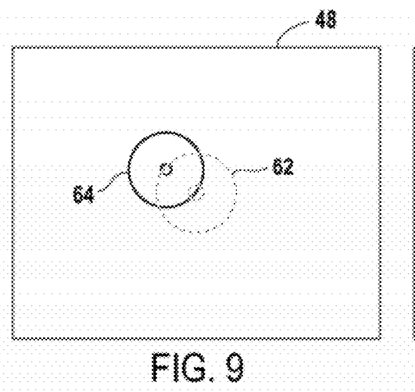
FIG. 9 is a representation of HMD helmet-referenced and HUD reticles, shown prior to coarse bore sighting.
Figure 10:
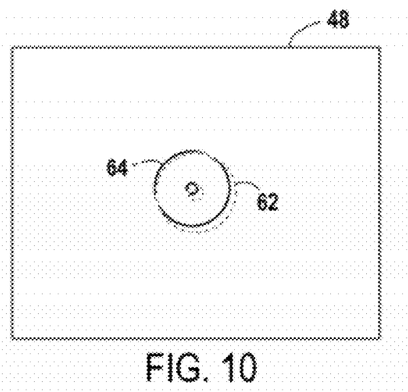
FIG. 10 is a representation of HMD helmet-referenced and HUD reticles, shown after coarse bore sighting.

A "coarse boresight" step, shown in FIGS. 9 and 10, is performed first. A helmet-referenced reticle 64 is displayed by the LOE 48. In many aircraft, the helmet-referenced reticle 64 is displayed by selecting a "coarse boresight" mode on a multi-function control display (MFCD). A similarly-shaped gun boresight reticle 62 is displayed on the HUD and is visible through the LOE 48. The user orients the helmet 10 vertically, centers the helmet 10 on the HUD, and aligns the reticle 64 with reticle 62 by yaw (rotating the helmet about a vertical axis) and tilt. The user then presses a calibration button, e.g., on a hands-on throttle and stick (HOTAS) to indicate proper alignment. Precision alignment of the reticles 62, 64 is not necessary in the coarse boresight step.

Figure 11:
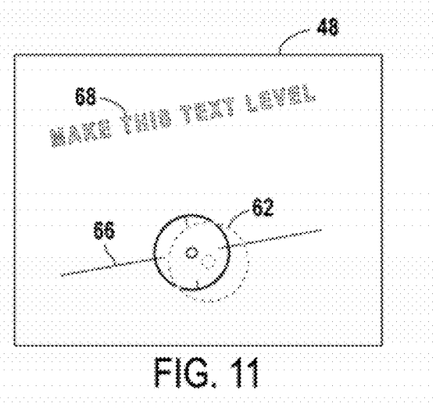
FIG. 11 is a representation of HMD aircraft-referenced and HUD reticles, shown prior to fine bore sighting.
Figure 12:
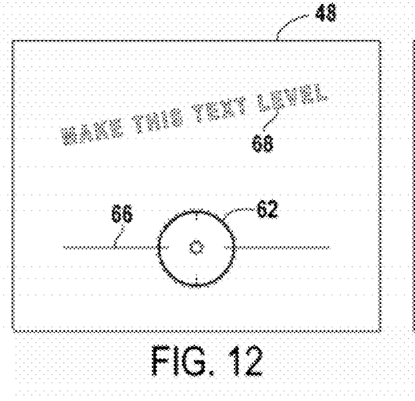
FIG. 12 is a representation of HMD aircraft-referenced and HUD reticles, shown after fine bore sighting.

The second step in the calibration process, shown in FIGS. 11 and 12, is a "fine boresight." As in the coarse boresighting step, the gun boresight reticle 62 is displayed on the HUD and is visible through the LOE 48. In this step, the helmet-referenced reticle 64 displayed by the LOE 48 is replaced with an aircraft-referenced reticle 66, which preferably includes lines representing the wings of the aircraft. In addition, helmet-referenced text 68 is also preferably provided. The user then performs a precise alignment of the aircraft-referenced reticle 66 to the gun boresight reticle 62, preferably using cursor controls for tilt, yaw and roll located on the HOTAS.

Figure 13:
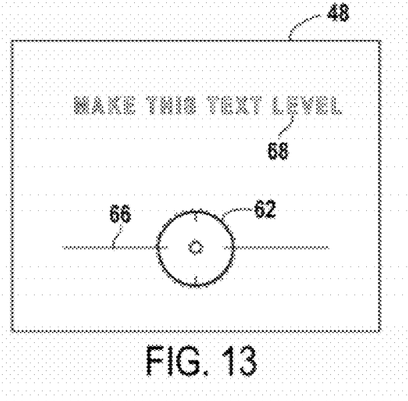
FIG. 13 is a representation of HMD aircraft-referenced and HUD reticles, shown after helmet symbol adjustment.

If, following the completion of the fine boresighting step, the helmet-referenced text 68 is not level when the vehicle-referenced reticle 66 and gun boresight reticle 62 are aligned, an optional third calibration step (shown in FIGS. 12 and 13) can be performed using a different roll control on the HOTAS. This step will be necessary if the helmet 10 was not vertical during the coarse boresighting step.

Calibration data is preferably collected by the interface control unit 34 and/or the mission computer 36 during each of the above-described boresighting steps. The interface control unit 34 is preferably programmed to use the calibration data to adjust how HMD image data received from the mission computer 36 (including target-related and aircraft-related data) is displayed on the display pod 42. In most cases, such adjustments will consist of rotational and/or translational shifting of the images forwarded to the display driver 46 so that the images displayed on the LOE 48 are in the correct rotational and translational position, based on the calibration data. Any suitable software-based algorithm could be used to perform the desired shifting.

While there have been shown, described and pointed out fundamental novel features of the invention as applied to preferred embodiments thereof, it will be understood that various omissions, substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed, described or suggested form or embodiment as a general matter of design choice. It is the intention, therefore, to be limited only as indicated by the scope of the claims appended hereto.

The invention claimed is:

1. An apparatus comprising:
   a helmet;
   a base plate affixed to a portion of the helmet, the base plate being removable from the helmet;
   a mounting bracket connected to the base plate;
   an accessory bracket connected to the base plate, the accessory bracket having an accessory joint;
   a display device for displaying symbology information that is positioned between an inner visor, which is positioned between an eye of a person wearing the helmet and the display device, and a vision-related device when the vision-related device is in a deployed position; wherein:
      the display device is further pivotally adjustable in a clockwise or counterclockwise direction from between the inner visor and the vision-related device when the vision-related device is in the deployed position,
      the display device is mounted to the mounting bracket,
      the vision-related device is mounted to the accessory joint, and
      the vision-related device is viewable through the display device when the display device is positioned between the inner visor and the vision-related device, the display device is in an operating state or a non-operating state, and the vision-related device is in the deployed position; and
   a helmet tracker sensor affixed to the helmet that is adapted to track the orientation of the helmet and adjust the symbology information based on the orientation of the helmet,
   wherein the vision-related device is selected from the group consisting of night vision goggles and an outer visor.

2. The apparatus of claim 1, wherein the inner visor is mounted to the helmet.

3. The apparatus of claim 1, wherein the vision-related device is the night vision goggles.

4. The apparatus of claim 1, wherein the vision-related device is removably attached to the accessory joint.

5. The apparatus of claim 4, wherein the vision-related device comprises the outer visor for use during the day which is interchangeable with the night vision goggles for use during the night.

6. The apparatus of claim 4, wherein the helmet further comprises a brow edge and the accessory bracket is located above the brow edge.

7. The apparatus of claim 1, wherein the helmet includes a brow edge and the base plate is positioned above the brow edge.

8. The apparatus of claim 1, wherein the display device is transparent.

9. The apparatus of claim 1, wherein the display device comprises a light wave-guide optical element.

10. The apparatus of claim 1, wherein the display device is part of a helmet-mounted display (HMD) system.

11. The apparatus of claim 10, wherein the HMD system further comprises a helmet-vehicle interface that connects the display device to an interface control unit.

12. The apparatus of claim 11, wherein the HMD system is adapted to display targeting pod cuing symbology on the display device.

13. The apparatus of claim 12, wherein the HMD system includes a calibration function that allows the position and orientation of images displayed on the display device to be adjusted to compensate for the position and orientation of the display device relative to the helmet.

14. The apparatus of claim 1, wherein the symbology information comprises at least one selected from a group consisting of targeting-related information and vehicle-related information.

15. A method of mounting a display device to a helmet, the method comprising:
  (a) affixing a base plate to a portion of the helmet, the base plate including a mounting bracket to which the display device is mounted and an accessory bracket to which a vision-related device is mounted, the base plate being removable from the helmet;
  (b) positioning the display device so that when the helmet is worn by a person symbology information is displayed to the person wearing the helmet, wherein:
    the display device is positioned between an inner visor, which is positioned between an eye of a person wearing the helmet and the display device, and the vision-related device,
    the display device is pivotally adjustable in a clockwise or counterclockwise direction from between the inner visor and the vision-related device,
    the vision-related device is viewable through the display device when the display device is positioned between the inner visor and the vision-related device, the display device is in an operating state or a non-operating state, and the vision-related device is in a deployed position;
  (c) positioning the inner visor so that when the helmet is worn by the person, the inner visor is located between the eye of the person wearing the helmet and the display device;
  (d) affixing to the helmet a helmet tracker sensor to track the orientation of the helmet and adjust the symbology information based on the orientation of the helmet
  wherein the vision-related device is selected from the group consisting of night vision goggles and an outer visor; and wherein the symbology information comprises at least one selected from a group consisting of targeting-related information and vehicle-related information.

16. The method of claim 15, further comprising:
  (e) interchanging the vision-related device between the outer visor for use during the day and the night vision goggles for use during the night.

17. An apparatus comprising:
  a helmet;
  a base plate affixed to a portion of the helmet, the base plate being removable from the helmet;
  a mounting bracket connected to the base plate;
  an accessory bracket connected to the base plate, the accessory bracket having an accessory joint;
  a display device for displaying symbology information that is adapted to be positioned between an inner visor, which is positioned between an eye of a person wearing the helmet and the display device, and at least one vision-related device, wherein:
    the display device is pivotally adjustable in a clockwise or counterclockwise direction from between the inner visor and the at least one vision-related device,
    the at least one vision-related device is viewable through the display device when the display device is positioned between the inner visor and the at least one vision-related device, the display device is in an operating state or a non-operating state, and the at least one vision-related device is in a deployed position,
    the symbology information comprises at least one selected from a group consisting of targeting-related information and vehicle-related information,
    the at least one vision-related device comprises an outer visor or night vision goggles,
    the display device is operationally mountable to the mounting bracket, and
    the visor and the night vision goggles are interchangeably mountable to the accessory joint; and
  a helmet tracker sensor affixed to the helmet that is adapted to track the orientation of the helmet and adjust the symbology information based on the orientation of the helmet.

* * * * *